(12) United States Patent
Burgio et al.

(10) Patent No.: US 9,239,379 B2
(45) Date of Patent: Jan. 19, 2016

(54) METHOD AND DEVICES FOR PROCESSING RADAR SIGNALS

(71) Applicant: STMicroelectronics S.r.l., Agrate Brianza (MI) (IT)

(72) Inventors: Carmelo Burgio, Bergamo (IT); Dario Catalano, Agrate Brianza (IT); Giampiero Borgonovo, Seregno (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 131 days.

(21) Appl. No.: 13/888,025

(22) Filed: May 6, 2013

(65) Prior Publication Data

US 2014/0327566 A1     Nov. 6, 2014

(30) Foreign Application Priority Data

May 9, 2012    (IT) .............................. TO2012A0417

(51) Int. Cl.
*G01S 13/72*     (2006.01)
*G01S 13/93*     (2006.01)
(Continued)

(52) U.S. Cl.
CPC ............... *G01S 13/72* (2013.01); *G01S 7/354* (2013.01); *G01S 13/343* (2013.01); *G01S 13/42* (2013.01); *G01S 13/536* (2013.01); *G01S 13/931* (2013.01); *G01S 2013/0245* (2013.01); *G01S 2013/9375* (2013.01)

(58) Field of Classification Search
CPC ............ G01S 7/02; G01S 7/35; G01S 7/352; G01S 7/354; G01S 13/02; G01S 13/06; G01S 13/08; G01S 13/32; G01S 13/34; G01S 13/343; G01S 13/42; G01S 13/50; G01S 13/52; G01S 13/536; G01S 13/66; G01S 13/72; G01S 13/88; G01S 13/93; G01S 13/931; G01S 2013/0236; G01S 2013/0245; G01S 2013/9371; G01S 2013/9375
USPC ....................... 342/27, 28, 70–74, 81, 89–93, 342/104–115, 118, 128–133, 145–147, 175, 342/192–197
See application file for complete search history.

(56) References Cited

U.S. PATENT DOCUMENTS 6,266,004 B1    7/2001  Pannert et al.
7,545,310 B2 *  6/2009  Matsuoka ....................... 342/70
(Continued)

FOREIGN PATENT DOCUMENTS

WO    WO 2006/094510 A1    9/2006

OTHER PUBLICATIONS

Italian Search Report and Written Opinion for Italian Application No. IT TO20120417 dated Feb. 1, 2013.
(Continued)

*Primary Examiner* — Bernarr Gregory
(74) *Attorney, Agent, or Firm* — Allen, Dyer, Doppelt, Milbrath & Gilchrist, P.A.

(57) ABSTRACT

A method for processing signals received by a plurality of receiving antennas in a radar system, for example for road safety, which emits sequences of chirp-modulated signals, wherein the received signals are mixed with local replicas of the transmitted signals so as to generate, for each receiving antenna, a sequence of detection signals. The detection signals are subjected to Fourier-transform processing and beamforming processing for generating values of range, azimuth, and speed for at least one obstacle or "target" detected by the radar system. The method includes an acquisition process for yielding approximate values of range and azimuth of the obstacle, and a tracking process for yielding accurate range, azimuth and speed values of the obstacle itself.

22 Claims, 6 Drawing Sheets

(51) Int. Cl.
　　　*G01S 7/35* 　　(2006.01)
　　　*G01S 13/34* 　(2006.01)
　　　*G01S 13/42* 　(2006.01)
　　　*G01S 13/536* 　(2006.01)
　　　*G01S 13/00* 　　(2006.01)
　　　*G01S 13/02* 　　(2006.01)

(56) References Cited

U.S. PATENT DOCUMENTS

| | | | | |
|---|---|---|---|---|
| 7,683,824 | B2* | 3/2010 | Kai | 342/114 |
| 7,719,460 | B1* | 5/2010 | Nakagawa | 342/70 |
| 8,102,309 | B2* | 1/2012 | Nakagawa | 342/147 |
| 2004/0252047 | A1 | 12/2004 | Miyake et al. | |
| 2005/0156780 | A1* | 7/2005 | Bonthron et al. | 342/107 |
| 2011/0102242 | A1* | 5/2011 | Takeya et al. | 342/105 |
| 2011/0122013 | A1* | 5/2011 | Takeya et al. | 342/109 |

OTHER PUBLICATIONS

E. Barrick, D. "FM/CW Radar Signals and Digital Processing" NOAA Technical Report ERL 283-WPL 2; Jul. 1973, 28 pgs.

Jiang, et al. "Convergence Analysis of Complex Adaptive IIR Notch Filters" IEEE International Symposium on Circuits and Systems, (Jun. 9-12, 1997). 2325-2328. (Abstract Only).

Nixon, et al, "Feature extraction and image processing" London: Academic Press; 2008, pp. 360.

* cited by examiner

METHOD AND DEVICES FOR PROCESSING RADAR SIGNALS

CROSS REFERENCE TO RELATED APPLICATIONS

This application claims the priority benefit of Italian patent application serial number TO2012A000417, filed on May 9, 2012, which is hereby incorporated by reference to the maximum extent allowable by law.

BACKGROUND

1. Technical Field

The description relates to the processing of radar signals.

Various embodiments may refer to the processing of radar signals in the context of road-safety systems.

Various embodiments may refer to radar systems for new-generation motor vehicles.

2. Discussion of the Related Art

A growing number of currently produced vehicles are equipped with radar sensors that may be used, for example, as parking sensors (for warning of the closeness of obstacles and possibly for enabling automatic execution of the parking maneuver) and/or with anti-collision function (for example, to warn the driver that he is approaching too closely another motor vehicle in front of him with the consequent increase in the risk of bumping into said vehicle in the event of sharp braking on the part of said vehicle).

For new-generation vehicles, the extension of the radar functions may be envisaged according to the modalities represented schematically in FIG. 1, namely, in conditions in which a radar system R mounted on board a vehicle V is able to detect, in addition to the presence and to the distance or range of possible obstacles, also further parameters such as, for example, the angular position (azimuth), the speed, and other kinematic parameters of the obstacle (more commonly referred to, in the technical literature on radar systems, as "target").

Said functions may prove particularly useful in a context such as the one represented schematically in FIG. 1, hence in a situation where the radar R can perform the function of locating, for example, other moving vehicles or pedestrians crossing over a zebra crossing, said vehicles and/or pedestrians constituting, in fact, the "targets" of the action of detection performed by the radar and certainly not the targets for the vehicle V on which the radar R is installed.

Various considerations, for example of reliability of operation, lead to suggesting the use, for a function such as the one described, of LFMCW (Linear Frequency-Modulated Continuous-Wave) radar systems.

A radar of this nature is suited to the implementation of beam-forming/beam-steering functions, with consequent possibility of controlling the conformation of the beam being received and also of controlling steering thereof, i.e., the receiving direction, with the consequent possibility of improving the action of detection of the angular position of the obstacle or target.

As represented schematically in FIG. 2, a radar system of this nature may basically include a radio-frequency section 10 coming under (at least) one transmitting antenna Tx and at least one receiving antenna (usually a plurality of receiving antennas) Rx. Co-operating with the radio-frequency section 10 is a base-band device 12 that is able to perform functions such as acquisition, beam forming/steering, tracking, etc. The aim of this is to yield at output (for example, for visual and/or acoustic presentation on a display provided on the vehicle V equipped with the radar system R) data representing output information OI regarding the range, angular position (azimuth), speed, possibly acceleration, etc., of the targets.

As represented schematically in FIG. 3, the signal TS transmitted by an LFMCW radar is a sequence of chirps centred around a given frequency. For example, for applications in the automotive sector, said frequency may be chosen at a value of 77 GHz. Each chirp may be a frequency-modulated sinusoidal wave with a frequency f varying according to a ramp as a function of time, with a modulation depth BW that may range from some megahertz to some hundreds of megahertz.

The echo signal RS received reflected by the target is substantially a copy (attenuated in amplitude) of the transmitted signal TS delayed in time by an interval Tau corresponding to the round-trip time with respect to the target. The received signal RS may be mixed, according to a general heterodyne receiver scheme, with a (local) replica of the transmitted signal, so as to generate an intermediate-frequency signal IF. After amplification and treatments of various nature (band limiting, filtering) the intermediate-frequency signal IF may be subjected to processing (for example, after analog-to-digital conversion) within the base-band device 12 that generates the information OI on the target.

The diagram of FIG. 4, where Tchirp indicates the duration of each chirp of the signal, represents the main parameters that distinguish the transmitted signal TS and the received signal RS in a LFMCW radar system.

To a fair approximation, the delay Tau and the distance (range) of the target are linked according to the relation $$Tau = 2R/c$$

where c is the speed of light.

The delay Tau is in turn linked to the frequency IF of the intermediate-frequency signal deriving from mixing according to the relation $$IF = (BW/Tchirp) \cdot Tau$$

From the measurement of the frequency IF it is thus possible to arrive at the range.

The information content of the received signal RS is, however, richer, in so far as the received signal RS brings with it information not only on the range R of the target P but also on its movement parameters (for example, speed, acceleration, etc.). Furthermore, if—as is schematically illustrated in FIG. 5—a number of receiving antennas RX is used (which are to be considered co-located with respect to one another, namely located in one and the same position with distances of separation much shorter than the range R where the target is located), operating with modalities basically amounting to beam-forming/beam-steering techniques, it is possible to obtain also information on the angular position (azimuth) of the target P.

For example, as illustrated in Barrick, D. E., "FM/CW radar signals and digital processing," NOAA Tech. Report ERL 283-WPL 26, U.S. Dept. of Commerce, Boulder, Colo. 1973, the range and speed information may be extracted using a two-dimensional Fourier transform (for example, 2D FFT), applied to an input matrix composed using the echoes of a number of successive and contiguous chirp signals. The presence of a peak in the output matrix of the 2D FFT processing reveals the presence of a target, and from the corresponding indices it is possible to infer an indication of the values of range and of speed. The aforesaid input matrix may include, in each row, the values regarding a single ramp of the chirp signal, while the subsequent rows refer to the subsequent ramps of the chirp signal. Each column of the matrix represents, instead, a given "sample" in the chirp waveform, as received in successive ramps of the chirp signal.

Furthermore, when there is available a set of received signals RS obtained via a number of receiving antennas RX it is possible to combine the signal coming from different antennas and calculate, by applying a beam-forming algorithm that may be implemented completely in the numeric field, the direction of arrival (DOA) of the echo signal, which enables detection of the angular position (azimuth) of the target with respect to the transmitter.

In the possible mode of use exemplified in FIG. 1, a number of targets, such as for example the pedestrians P1, P2, P3, and P4 crossing over on a zebra crossing can be detected by the radar of a vehicle V that is arriving as located at different ranges and in different angular positions (azimuths), with yet further possible differences also as regards other movement parameters, such as for example the speed of pedestrians crossing over a zebra crossing.

The diagram of FIG. 6 illustrates a possible architecture of implementation of a scheme, as represented in general in FIG. 2, regarding a radar system of the type considered herein, i.e., a radar system R that emits sequences of chirp-modulated signals TS in which the signals RS received via a plurality of receiving antennas RX are mixed with local replicas of the or chirp-modulated transmission signals TS to produce, for each receiving antenna RX, a sequence of detection signals, it being possible to subject the detection signals thus obtained to Fourier-transform processing and beam-forming processing so as to generate values of range R, azimuth θ, and speed for at least one target P1-P4 of the radar system R.

In the diagram of FIG. 6 provided by way of example, it is assumed that the transmitting antenna TX (for simplicity of description reference will be made to a single transmitting antenna, even though it is possible to use an antenna array also in transmission, as illustrated in FIG. 5) is supplied by a generator 100 of the chirp transmission signal TS comprised in the radio-frequency stage 10, while the signal in reception R is assumed as coming from a plurality of k receiving antennas RS, each of which transfers to the radio-frequency stage 10 a respective signal in reception. Once mixed in a corresponding mixer 102 with a replica of the signal in transmission TS, each signal in reception produces a respective intermediate-frequency signal component IF. According to various known solutions, the various intermediate-frequency signals can be subjected to operations of filtering for de-noising, automatic gain control, etc. (implemented, for instance, in modules designated as a whole by 104) and to a subsequent analog-to-digital conversion (modules 106) with a view to transfer thereof to the base-band stage 12 dedicated to processing of the detection signals thus obtained.

According to various solutions, the treatment operations in question may be executed in the radio-frequency stage 10 operating on a number k of channels in parallel as many as are the receiving antennas RX and hence the components of the intermediate-frequency signal IF.

A similar structure on a number of channels organized in parallel (even only in a virtual way, i.e., without an effective separation) can be kept in the base-band stage 12 by providing buffer memories 120 from which the data may be transferred to two-dimensional Fourier-transform (2D FFT) processing modules 122.

From here the "FFT transformed" signals may pass on to a further stage 124, which is entrusted with execution of the beam-forming/beam-steering processing as a function of values of angles of azimuth determined by acting on an input 124a. A module 126 set at the output of the module 124 may perform the function of detecting the peaks of the signals deriving from the 2D FFT treatment after beam-forming/beam-steering processing.

The criteria of execution of the processing functions recalled previously are to be deemed in themselves known in the art (also from the bibliographical reference cited previously) and hence such as not to require a detailed description herein.

In this regard, it will be appreciated that, except for what will otherwise be described in what follows, what has been illustrated previously with reference to FIGS. 1 to 6 applies also to the exemplary embodiments.

SUMMARY

The inventors have noted that, assuming having to do with a sequence of N chirps of a received signal (constituting a so-called scan), the matrix on which the two-dimensional FFT processing is performed may need to be stored in the buffer-memory modules 120 row by row, i.e., on N rows, with each row containing M samples of a detection signal regarding one chirp. The two-dimensional FFT processing hence operates on all the data from the first row to the last (N-th) row.

The inventors have likewise noted that, according to criteria in themselves known (see, for example, the volume by Mark S. Nixon et al. "Feature extraction and image processing" Academic Press, London 2008, pp. 33-66), the 2D FFT algorithm is a separable algorithm in so far as it is possible to break it down into the sequence of two successive applications of a one-dimensional FFT (1D FFT) treatment, it being, for example, possible to carry out the first one-dimensional FFT on the N rows and the second one-dimensional FFT on the M columns of the matrix. In this way, during the acquisition of each chirp signal, it is possible to carry out the first two-dimensional FFT processing "on the fly", prior to storage of the intermediate results.

The inventors have, however, noted that, even operating in this way, before starting the second 1D-FFT processing, operating on the columns, it is necessary to wait for the availability of the N-th row of the matrix.

This necessitates having available a considerable storage capacity for storing the intermediate data, moreover considering the fact that said storage capacity may need to be replicated for each receiving channel RX. Furthermore, said data are kept in memory until all the 1D FFTs have been completed on the N columns, so that the corresponding area of memory will be in effect unavailable for further applications until all the calculations have been completed.

To be able to process all the data arriving from the radio-frequency stage 10 (in particular, of the converters 106 thereof) an extremely large storage capacity becomes virtually necessary, with dimensions that depend upon the rank of the input to the two-dimensional FFT (M samples of N successive chirps) and upon the efficiency of the processing engines used for FFT computing and for all the other processing operations, for example, beam forming/beam steering, detection of false alarms (CFAR—constant false-alarm rate), and so forth.

In applications designed for commercially available vehicles of current production, there exist evident limitations (also of cost) as regards the size of the memories used.

In this regard, the inventors have noted that the need to reduce as much as possible the size and complexity of the memory may suggest storing the intermediate results using (according to a general time-sharing scheme) the same memory used for the two-dimensional FFT function. This, however, entails not being able to process data further until the previous functions have been completed, causing the data received in the meantime from the radio-frequency stage 10, with the corresponding information content, to be lost. This situation is schematically represented in FIG. 7, where the blocks LS indicate blocks of data or samples that are lost between successive steps of acquisition or "capture" of the data DC in so far as in the meantime the memory potentially usable for gathering them is occupied to enable execution of the processing operations, represented by the blocks DP, of the data received previously.

Drawing conclusions, the inventors have noted that the solutions discussed previously generate various critical factors that are liable to generate inevitable conflict with one another, such as:

for storing the input and output data of the 2D FFT processing, which is an intrinsically complex processing, a large amount of memory is required, which is to be replicated for each input channel (antenna) and for each value of the azimuth angle of output of the beam former/beam steerer;

the selection/identification of the obstacles or targets can be implemented only at the end of processing, so that all the intermediate results are stored in a situation where the intermediate data are to a fair extent bound to be discarded since they are of no use;

the co-ordinates of range (hence the resolution in the determination of the range R) is conditioned by the "quantization" of the column indices of the output of the 2D FFT processing; similar considerations also apply to the values of speed, linked to the indices of the rows of the 2D FFT processing; similar limitations may exist for the values chosen for the angles of azimuth, in a situation where the interpolation for determining the values of range, speed, and azimuth starting from the quantized values can be implemented only with dedicated post-processing; and an aspect that is the last in the list but certainly not of least importance, considering the lags linked to the computation algorithms, is that it is practically impossible to process all the samples at input so that these are to a fair extent altogether ignored by the system, with consequent loss of information and accuracy of the system as a whole.

Said critical aspects, that have been pointed out with reference to a radar system for road use, may arise also in radar systems used in different contexts.

Various embodiments overcome, at least in part, the aspects outlined previously with reference to a radar system in which said aspects emerge.

In various embodiments, a method is provided having the characteristics recited in the claims.

Embodiments also regard a corresponding device, a corresponding radar system, as well as a computer program product that can be loaded into the memory of at least one computer and includes portions of software code that are able to execute the steps of the method when the product is run on at least one computer. As used herein, reference to such a computer program product is understood as being equivalent to reference to a computer-readable medium containing instructions for control of the processing system in order to coordinate implementation of the method according to the invention. The reference to "at least one processor" is understood as highlighting the possibility that embodiments may be implemented in modular and/or distributed form.

Various embodiments may be based upon the possibility of modifying the processing criteria described previously considering the fact that the processing of the data can be virtually divided into two distinct sections (acquisition and tracking of the target), thus overcoming the limitations linked to execution of the aforesaid functions jointly.

Various embodiments may stem from the observation of the fact, already evoked previously, that the two-dimensional FFT (2D FFT) processing can be separated into the computation in sequence of two successive one-dimensional FFTs (1D FFTs) with the further possibility of replacing one of said computations with a lighter and more efficient processing modality, for example resorting to a filtering function such as a notch-filter function.

BRIEF DESCRIPTION OF THE DRAWINGS

Embodiments will now be described, purely by way of non-limiting example, with reference to the annexed drawings, wherein.

DETAILED DESCRIPTION

In the following description various specific details are illustrated aimed at providing an in-depth understanding of various exemplary embodiments. The embodiments may be obtained without one or more of the specific details, and with other methods, components, materials, etc. In other cases, known structures, materials, and operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided only for convenience and hence do not define the sphere of protection or the scope of the embodiments.

As already mentioned, both as regards the possible spheres of application, and as regards the possible modalities of implementation, the description furnished previously should be deemed applicable—except for what is otherwise described in what follows—also to the exemplary embodiments.

Figure 2:
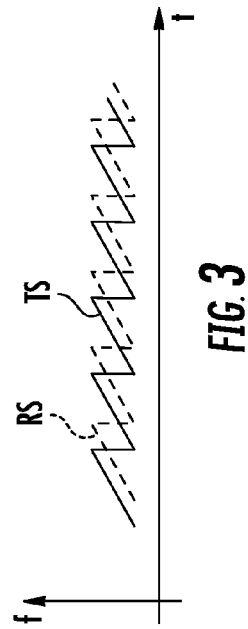
FIGS. 1 to 7 have already been described previously.
Figure 3:
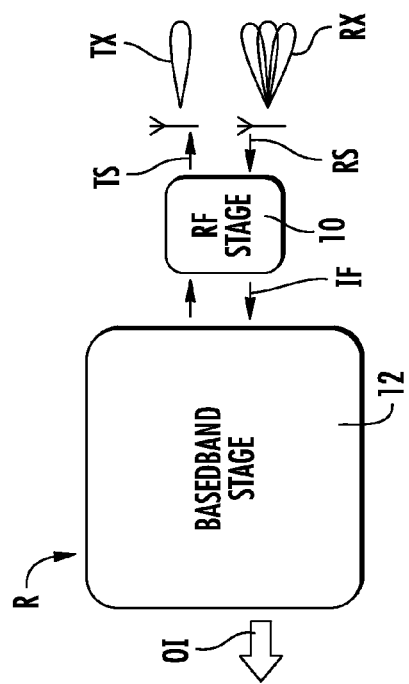
Figure 6:
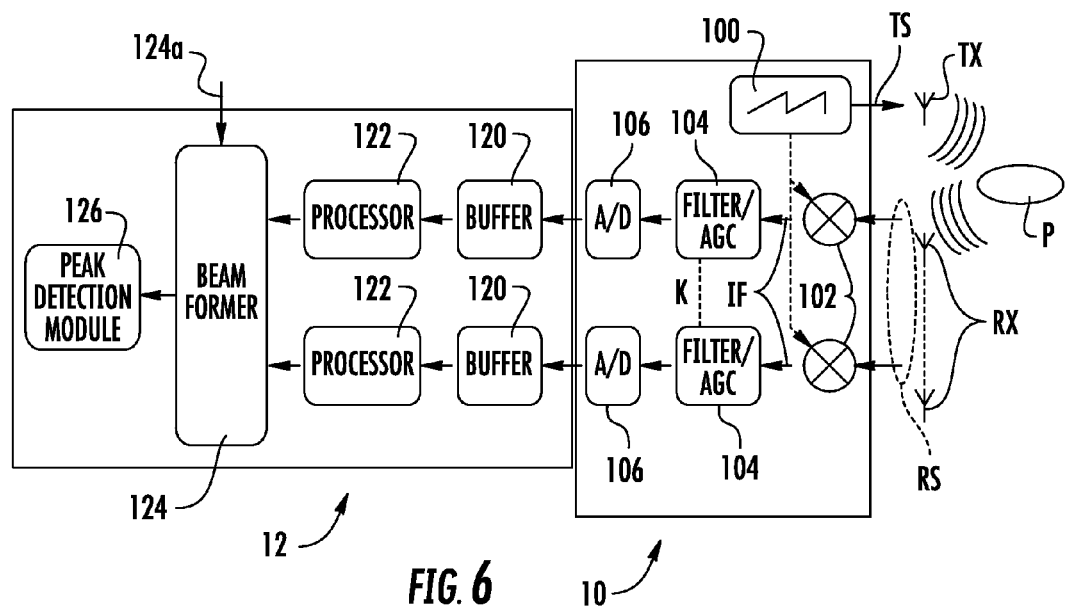
Figure 8:
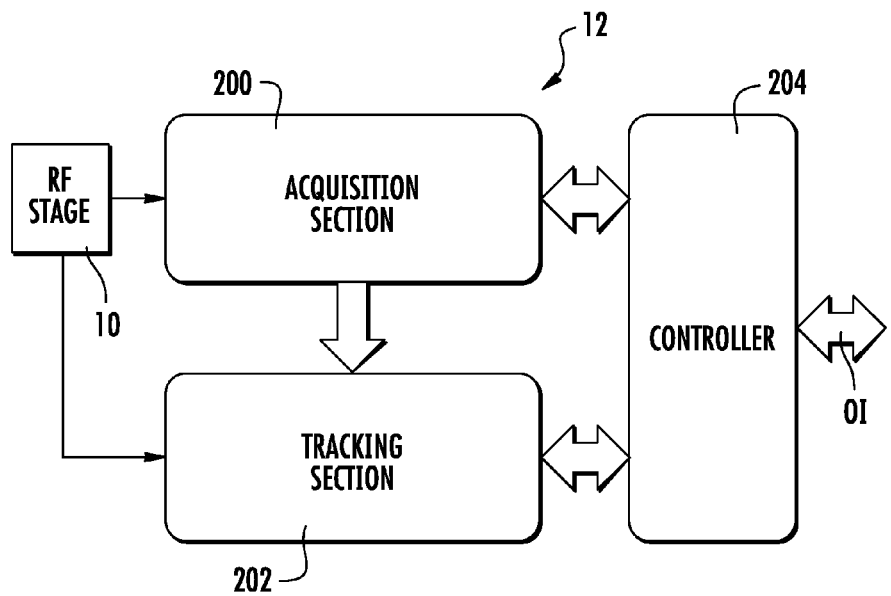
FIG. 8 illustrates a possible architecture of embodiments.

In line with what has already been represented, with reference to the technological background, in the diagrams of FIGS. 2 and 6, various embodiments may hence refer to a radar system R that emits sequences of chirp-modulated signals TS, in which the signals RS received via a plurality of receiving antennas RX are mixed with local replicas of the chirp-modulated transmission signals TS to produce, for each receiving antenna RX, a sequence of detection signals, it being possible to subject the detection signals thus obtained to Fourier-transform processing and beam-forming processing so as to generate values of range, azimuth, and speed for at least one target P1-P4 of the radar system R.

Various embodiments may be based upon the fact of organizing the base-band stage 12 in two sections 200 and 202.

Of these, the section 200 performs the function of acquisition, i.e., of identification of the (possible) presence of one or more targets P1, P2, P3, P4, . . . with an evaluation, implemented with a certain margin of uncertainty, of values of range and of azimuth, without making a specific evaluation of specific attributes of the target. In various embodiments, the calculation of specific attributes and/or accurate values may be entrusted to the tracking section 202.

In various embodiments, the sections 200 and 202 may interact with one another and/or with a further section 204 that superintends operation of the device 12 as a whole. In various embodiments, the section 204 may then perform/superintend various functions of control, or human-machine interface (e.g., display), which do not form the subject of the present description. In various embodiments, the section 204 may manage a list of the targets comprised within the surveillance field of the radar system, it being possible for each target to enter, remain within (in a fixed position or else in a variable position, i.e., shifting about), and exit from said surveillance field.

Figure 9:
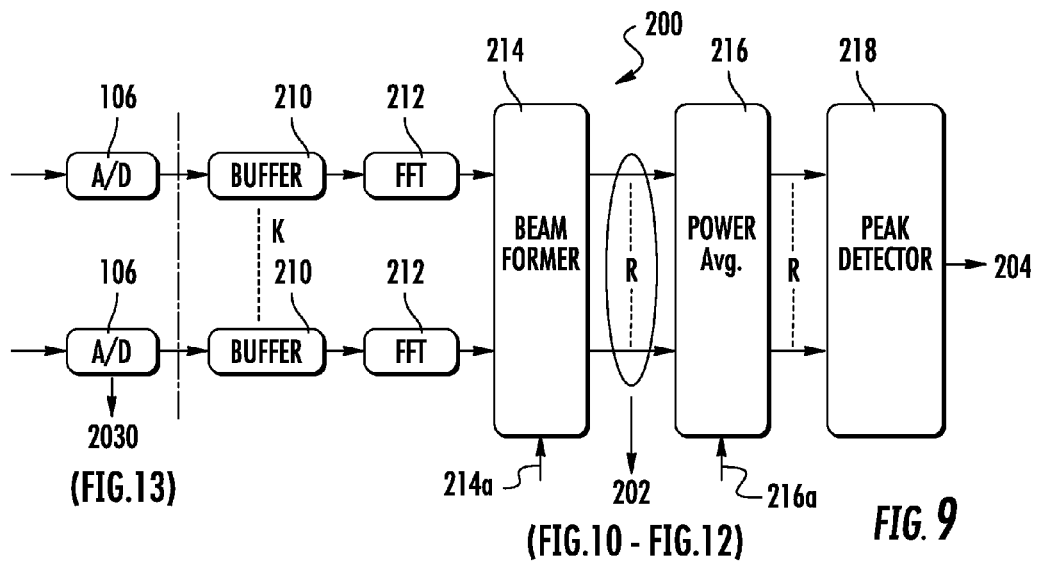
FIGS. 9 and 10 are block diagrams representing details of possible embodiments.
Figure 10:

With reference to the diagram of FIG. 9, in various embodiments, the detection signals coming from the radio-frequency stage 10 (in particular, in the left-hand part of FIG. 9 the analog/digital converter modules 106 are visible, here presented as organized on a number k of channels as many as are the receiving antennas RX) are sent at input to the stage 200 and stored therein (it being possible to keep one and the same organization on parallel channels, or else to resort to a different architecture) in respective buffers organized with a "vector" structure. The use of the term vector (as opposed to the term "matrix") is here intended to highlight the fact that, in various embodiments, the input data chirp by chirp stored in the buffer 210 may be subjected in respective modules 212 to a 1D-FFT processing. Thanks to said processing, the presence of a peak in the output spectrum resulting from the 1D-FFT processing is such as to indicate the possible presence of a target P within an approximate range value.

In various embodiments, the data resulting from the one-dimensional FFT processing implemented in the modules 212 may then be subjected, in a module 214 (which also operates according to criteria in themselves known), to a beam forming/beam steering operation according to a set of angles of azimuth fixed and pre-selected as a function of a corresponding input datum supplied, for example, on a line 214a (for example, as a function of a regulation value set on the section 204).

The aim of the above is to acquire an approximate indication of the angular position of the target with respect to the radar. The angular resolution depends upon the number of angles of azimuth on which one is operating; since the indication on the direction of the target that it is desired to obtain may be approximate, it is possible to operate on a smaller number of different angles of azimuth, thus containing the computational complexity (and the requirements in terms of the necessary processing resources).

Figure 7:
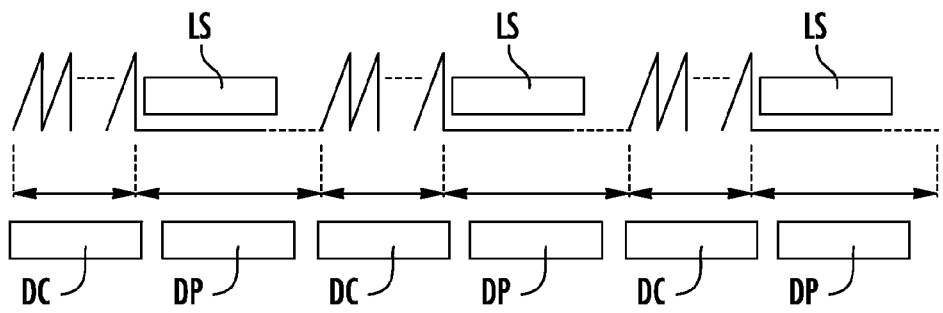

In various embodiments, considering the as a whole contained amount of memory and of processing power required, it is possible to operate in real time on all the chirp frames at input thus preventing "gaps" from being created like the ones represented by the blocks LS of FIG. 7.

In various embodiments, on the data at output from the module 214 it is possible to carry out, in a module 216, an operation of power averaging over an integration time supplied, for example, on a line 216a (for instance, as a function of a value of regulation set on the section 204) so as to be able to increase in this way the sensitivity of the system.

In a solution like the one described in relation to the technological background, such an operation could be executed only with a very heavy burden in terms of amount of memory and processing capacity available: the operation of power integration should regard data organized in a matrix structure, whereas in various embodiments as exemplified in FIG. 9 said operation may be performed on data organized in a vector form. Once again with reference to a solution like the one described in relation to the technological background, such an operation of power integration would be largely ineffective in the presence of chirp frames rarefied as a result of the presence of the gaps exemplified by the blocks LS of FIG. 7, with a situation that is particularly critical in the case where the target moves and there is available a range information that is identified only ambiguously.

In various embodiments, the signals subjected to power integration at output from the module 216 may be subjected to further processing operations, such as for example a CFAR (Constant False-Alarm Rate) processing with peak detection, etc. The corresponding results may then be sent on to the section 204.

In various embodiments, in the section 200 it is hence possible to avoid proceeding to an evaluation of the information of speed (which, instead, is carried out in a solution such as the one described in relation to the technological background, in the second part of the 2D FFT processing, carried out by columns).

In various embodiments, as exemplified in FIG. 9, in the modules 212 it is possible to carry out just one 1D-FFT processing, thus overcoming the various critical aspects outlined in the introductory part of the present description linked to the large amount of memory required for performing the 2D FFT processing, in particular in relation to the replica for each channel at input (i.e., for each receiving antenna RX) and for each angle used for the beam-forming operation.

Furthermore, in various embodiments, the solution represented schematically in FIG. 9 enables real-time operation on all the samples at input, preventing the loss of information represented by the gaps indicated by the blocks LS of FIG. 7.

In various embodiments, starting from the results of the 1D-FFT processing (modules 212) and of the beam-forming processing (module 214)—possibly also following upon the further processing operations of blocks 216 and 218, which are able to "clean up" the signal further—in the section 204 it is possible to organize a list of the potential targets referred, for each target, to approximate values of range (range index) and azimuth.

In various embodiments, starting from this approximate information, it is possible to organize more precise tracking processes.

In various embodiments, the results of the 1D-FFT processing (modules 212) and beam-forming processing (module 214) may be supplied to a further processing structure, which, starting from the aforesaid data, is able to process information on the speed of the target that is to be sent to the section 204.

Figure 11:
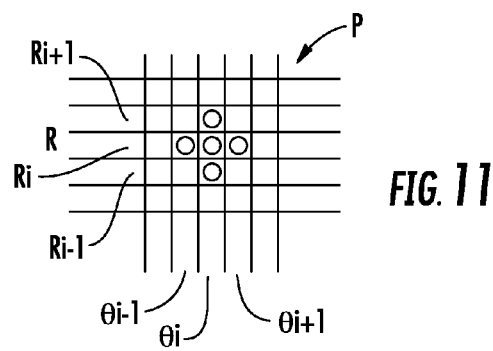
FIG. 11 illustrates some concepts underlying the embodiments.

All this affords, as compared to the solution described in relation to the technological background (see, for example, FIG. 6), the advantage represented by the fact that the action of accurate determination of the parameters of speed, range, and azimuth can be circumscribed to the data regarding a target already identified, the position of which is already determined approximately in the acquisition step, both at the level of range, and at the level of azimuth, for example as represented schematically in FIG. 11.

The representation of FIG. 11 exemplifies the possibility, in various embodiments, of seeing the aforesaid approximate values of range and azimuth, as supplied by the detection signals subjected to 1D-FFT processing (modules 212) and beam-forming processing (module 214), as being comprised in a grid of position cells, each representing a possible position (in range and azimuth) of a target in the area of coverage of the radar system R, it being then possible to perform the action of tracking of the target with complex value in a set of cells identified in the neighborhood of the approximate values of range and azimuth obtained starting from the detection signals subjected to 1D-FFT and beam-forming processing (modules 212 and 214).

The foregoing is based upon the criterion whereby the presence of a peak (i.e., of a maximum value) of the detection signal in a certain cell indicates the location of the target in said cell, and the passage of the peak into another adjacent cell indicates the displacement of the target into this other cell.

For example, the representation of FIG. 11 regards a possible embodiment in which the action of tracking may be performed in the section 202 on the aforesaid grid, operating on sets of adjacent cells, as including:

a central cell of the set, corresponding to the approximate values of range $R_i$ and azimuth $\theta_j$ supplied by the acquisition section;

a first pair of nearby cells, one of which has a lower value of range $R_{i-1}$ and the other a higher value of range $R_{i+1}$ as compared to said central cell and both of which have the same value of azimuth $\theta_j$ as said central cell; and a second pair of nearby cells, one of which has a lower value of azimuth $\theta_{j-1}$ and the other a higher value of azimuth $\theta_{j+1}$ as compared to said central cell and both of which have the same value of range $R_i$ as said central cell.

FIG. 11 does not pretend, on the other hand, to provide a concrete illustration and is hence to be understood mainly as a conceptual representation. The corresponding information is on the other hand usable also for other purposes of various nature (for example, labelling of the targets, etc.) in the computer system (for example, microprocessor system) that superintends the general function of the radar system R.

In the following description attention will be drawn prevalently to the possible use of this information for handling operation of the tracking section 202.

Figure 1:
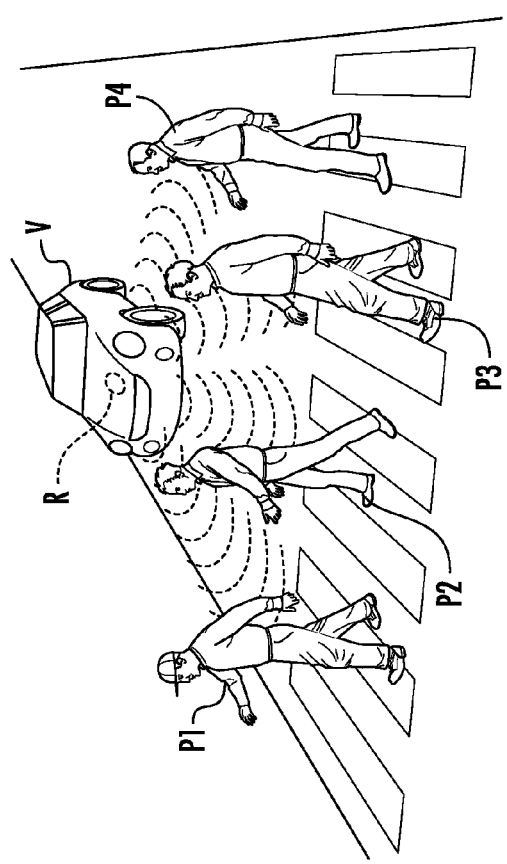
Figure 4:
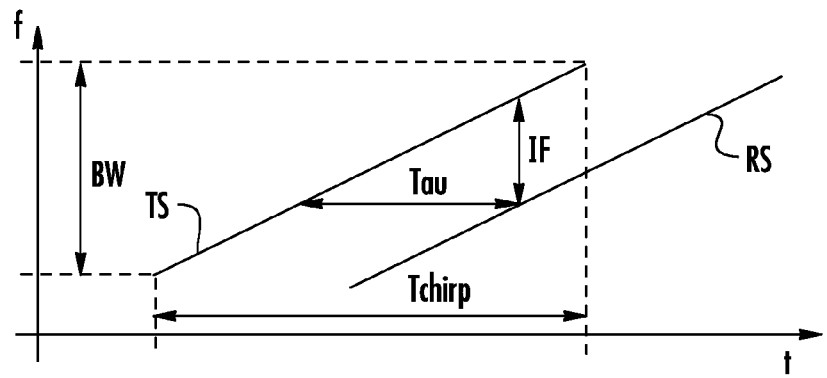
Figure 5:
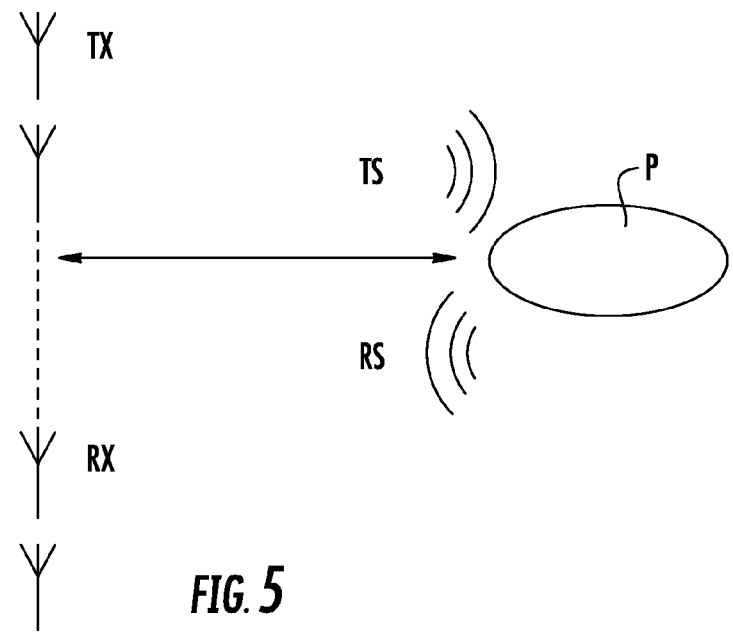

What has been illustrated herein by way of example may apply to each of a plurality of targets (e.g., the targets P1 to P4 of FIG. 1).

For simplicity of treatment also in what follows reference will continue to be made prevalently to a single target, but what has been said for one target is in general applicable to a plurality of targets. In various embodiments the tracking section 202 may envisage the use of as many tracking engines as are the targets currently identified and monitored. Various embodiments as exemplified herein may consequently envisage implementing tracking engines in a number that may vary as a function of the number of targets that are currently being monitored, hence according to an as a whole adaptive scheme such as to enable, for example, allocation, for other processing purposes, of storage and computational resources that are not at the moment being used because just one target or a reduced number of targets is being monitored.

Figure 12:
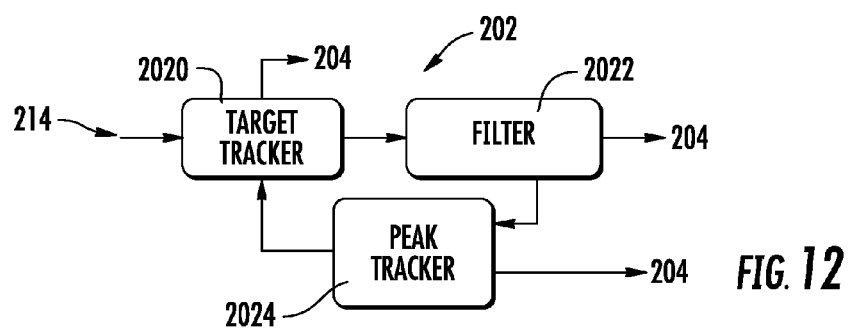
FIGS. 12 and 13 are other block diagrams representing details of possible embodiments.

As represented schematically in FIG. 12, in various embodiments each of said tracking engines may be associated to a target so as to "latch on" to it in order to extract from a corresponding subset of the detection signals accurate information on the behaviour/nature of the target (mainly: range, azimuth, speed, and possibly acceleration, angular and linear dimensions).

In various embodiments, each individual tracking engine is also able to detect that the target that had been "latched on" to has left the area of coverage of the radar, sending corresponding information to the section 204 for updating the list of the targets.

In various embodiments, the core of each tracking engine comprised in the section 202 may be constituted by a complex adaptive filter, for example of the type known as CANF (Complex Adaptive Notch Filter).

In various embodiments, a CANF or equivalent filter of an adaptive type may be used, capable of operating without supervision, i.e., by "locking" a possible tone that is present, operating autonomously.

In various embodiments, the filter in question may operate on the output signals of the module 214 (hence, on the signals subjected to 1D-FFT processing and beam-forming processing) as a function of a selection of the cell or cells on which to operate (see FIG. 11) implemented in a module 2020 driven by the block 2024 that tracks the target in real time and then selects the appropriate cells, with the corresponding information that can at the same time be notified to the section 204.

In various embodiments, the cell 2020 may have the function of sending to the filter 2022 only subsets of data corresponding to a target the position of which has already been determined in terms of approximate values of range and azimuth.

It will be appreciated that this constitutes a significant difference with respect to the solution described with reference to the technological background, where the extraction of the information of speed presupposes the execution of the second phase of the 2D-FFT processing performed virtually on all the input data (in actual fact, this entailing the need to forgo continuous processing in real time, thus giving rise to the gaps LS of FIG. 7).

In various embodiments, the filter 2022, of which a CANF of course constitutes just one of the possible examples of implementation, may have the function of tracking, in the aforesaid subset of detection signals, the presence of a complex-valued target signal, the phase variation of said complex-valued target signal yielding a value of speed of the target tracked.

The aforesaid complex-valued target signal corresponds to the presence, in the detection signal of a radar, such as a LFMCW radar, of a complex-valued sinusoidal wave embedded in a noisy environment.

In various embodiments, the filter 2022 may be able to measure also the amplitude of the sinusoidal wave tracked.

In various embodiments, as exemplified in FIG. 12, the filter 2022 may be supplied, as is indeed represented schematically in FIG. 12, with the output signal of the module 214.

In said embodiments, the filter 2022 hence works on subsets of detection signals that have undergone 1D-FFT processing and beam-forming processing. The corresponding information in terms of range and azimuth is, as has already been said more than once, approximate in so far as it is discretized in terms of 1D-FFT indices and as a function of the number of angles used for the beam-forming operation.

In various embodiments, as further described in what follows with reference, for example, to FIG. 12, the tracking section 202 may instead be configured so as to work on subsets of detection signals acquired directly at output from the radio-frequency stage (A/D converters 106), hence being "raw" signals that have not undergone 1D-FFT processing and beam-forming processing.

For example, in the case where a CANF is used for this purpose (as described, for example, in S. Nishimura et al.: "Convergence Analysis of Complex Adaptive IIR Notch Filters"—IEEE International Symposium On Circuits and Systems, New York, Jun. 9-12, 1997, pp. 2325-2328), the operation of the filter 2022 may be based upon the fact that in the detection signal brought to its input (both after 1D-FFT processing by the modules 212 and beam-forming processing by the module 214 and as "raw" signal coming from the radio-frequency stage 10), the presence of a target P implies the presence of a tone.

As has already been seen in the introductory part of the present description, the frequency of this sinusoidal wave (which may be detected as a "peak" following upon Fourier-transform processing, implemented as 1D FFT in the modules 212 of FIG. 9 or as DFT in the module 2030 that will be described in what follows with reference to FIG. 13) is linked to the distance or range R of the target.

A beam-forming operation (as implemented in the module 214 of FIG. 9 or in the module 2032 that will be described in what follows with reference to FIG. 13) enables rotation of the angle of observation in azimuth by mixing the peaks deriving from the various channels corresponding to the various receiving antennas RX according to a linear combination (with the use of complex weighting coefficients) of the various possible beam values. This may be performed in various embodiments according to the known criteria underlying operation of multiple antenna arrays or "phased arrays", widely used in the radar sector.

The resulting value has a maximum amplitude when the coefficients linked to the action of beam forming correspond to the position of the target.

If the speed of the target is equal to zero, i.e., if the target is stationary with respect to the radar R, the phase of the complex value that is subjected to the tracking action by the filter 2022 is fixed in time, chirp after chirp. It changes, instead, in time, once again chirp after chirp, if there is a relative movement between the target and the radar, so that the variation of said phase indicates the speed of the target, with a variation equal to zero if the target is stationary.

In general, the output of a beam-forming module such as the module 214 or the module 2032 is a vector that rotates in the complex domain with a frequency of rotation strictly linked to the speed of the target.

A CANF hence enables the information to be obtained regarding the speed of the target, it being possible for said speed information to be transferred, for example, to the section 204, as represented in the left-hand part of FIG. 12.

The fact that the processing performed in the filter 2022 converges on such a frequency, thus identifying the speed of the target, provides a further confirmation of the existence of the target. In various embodiments, whether the processing performed in the filter 2022 is crowned by success or not may be used to provide confirmation of the fact that the target tracked is effectively present and does not correspond to a false alarm.

In possible embodiments where the tracking function is implemented on detection signals acquired at output from the beam-former 214, hence with discretized values of range and azimuth organized in adjacent cells, it is possible to envisage that the action of tracking is performed in relation to the cell in a central position and to the nearby cells in range and azimuth, for example according to the cross-like configuration represented in FIG. 11.

This action of sweeping of the space surrounding the central peak may be performed according to a general feedback mechanism represented in the diagram of FIG. 12 by a module 2024 representing the action of tracking of the peak of the aforesaid complex value (having a phase the variation of which in time indicates the speed of the target). On the one hand, the module 2024 supplies to the section 204 the data of range R and of angle of azimuth θ and, on the other, intervenes on the logic of selection of the cell 2020 so as to enable the action of processing implemented by the filter 2022 also to be directed to the peaks that are around the central peak. In this way, it is possible to perform the aforesaid action for the five peaks represented in FIG. 11 by implementing accordingly five different filters 2022 that are expected to converge all on one and the same speed value, for example with the central peak that, since it has the maximum amplitude, will serve as reference for the four peripheral peaks.

In various embodiments, having available the peak power signal in various adjacent cells it is possible to detect possible hopping of the target from one cell to a nearby cell (both in range and in azimuth). When the target passes from one cell to another, the action of tracking is modified accordingly. With reference to the conceptual scheme of FIG. 11, in said circumstances the centre of the cross represented shifts to a nearby cell, with a concept that may be applied both as regards range tracking and as regards azimuth tracking.

In various embodiments, the datum of speed of the target may be obtained as set of continuous values, unlike what happens resorting to the 2D FFT of the solution discussed with reference to the technological background, where the resulting speed data are in any case discretized according to the indices of the FFT.

Figure 13:
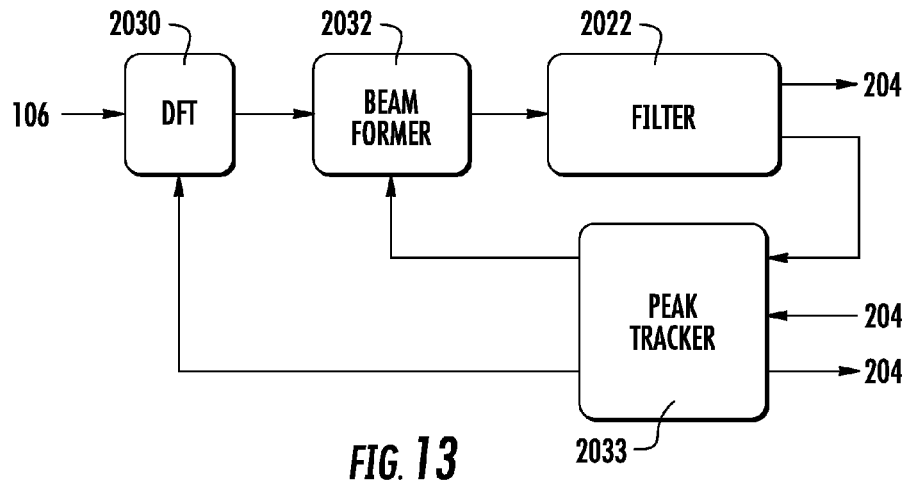

In various embodiments, as represented schematically in FIG. 13, it is possible to envisage that the function of tracking of the targets is conducted, for example by the section 202, directly on the original or raw data coming from the radio-frequency stage 10 (for example, from the analog-to-digital converters 106) and hence not subjected to the 1D-FFT processing and beam-forming processing by the modules 212 and 214 of the acquisition section 200.

In this way, it is possible to obtain more accurate location information without losing the intrinsic advantage of the solutions already illustrated with reference to FIGS. 9 to 12, represented by the fact that the processing of the aforesaid raw data affects a subset of signals/data that is identified by exploiting the location information (range $R_i$ and azimuth $\theta_j$) supplied by the acquisition section 200. Also in the embodiments exemplified in what follows, the action of tracking can hence be limited to a neighborhood in which the likely presence of a target has already been ascertained, with consequent lightening of the burden of data storage and of the computational burden and/or the possibility of carrying out more sophisticated processing operations.

In various embodiments, in the case of range information, the Fourier-transform processing implemented on the raw detection signals coming from the radio-frequency stage 10 may be a discrete Fourier transform or DFT performed in a module 2030 and limited to a neighborhood of (for example three) adjacent values chosen with a resolution step that is a function of the desired precision in range and of the processing capacity allocated/available. In various embodiments, this may occur under the control of the section 204 for example starting, as initial value, from the approximate range value supplied by the section 200 (known to the section 204) and then proceed with a feedback updating mechanism.

In various embodiments, in the case of the azimuth information, the beam-forming processing operation implemented in the module 2032 starting from the raw detection signals (for example, by acting on the output of the module 2030 that is to carry out the DFT) may be limited to a neighborhood of (e.g., three) adjacent values chosen with a resolution step that is a function of the desired precision in azimuth and of the allocated/available processing capacity. In various embodiments, this may occur under the control of the section 204, for example starting from, as initial value, the approximate value of azimuth supplied by the section 200 (known to the section 204), and then proceeding with a feedback updating mechanism.

The sensing signals subjected to DFT processing (module 2030) and beam-forming processing (module 2032) are subjected to filtering by the module (e.g., CANF) 2022, which, in various embodiments, may operate basically as exemplified for the filter 2022 represented in FIG. 12.

The filter 2022 consequently supplies the section 204 with the speed value identified as a function of the temporal variation of the phase angle of the global value tracked by the filter 2022, and the filter 2022 itself drives a module 2033 that is to carry out (substantially as occurs in the module 2024 of FIG. 12) a function of tracking of the peak of the complex signal, with a view to obtaining accurate values of range (range R) and azimuth θ. These values are, on the one hand, sent to the section 204 and, on the other, fed back to the modules 2030 and 2032 for regulating in an adaptive way determination of the values on which said modules implement the DFT processing and the beam-forming processing, respectively.

For example, in various embodiments as exemplified in FIG. 13, at the start of the tracking process, the (approximate) information of range and azimuth is copied starting from the acquisition section 200 at the level of initial training of the filter 2022. After this initial training, the values of range and azimuth (and hence the DFT and beam-forming parameters) are updated by the feedback loop that includes the module 2034.

In various embodiments (as represented schematically in FIGS. 13 and 14), the tracking algorithm (in a way conceptually akin to what has been described previously with reference to the conceptual representation of FIG. 11) may operate by measuring the power of two range peaks set alongside and of two azimuth peaks set alongside. When the powers of these measurements yield the same result, the respective central values identify exactly the position in range and azimuth of the target.

Figure 14A:
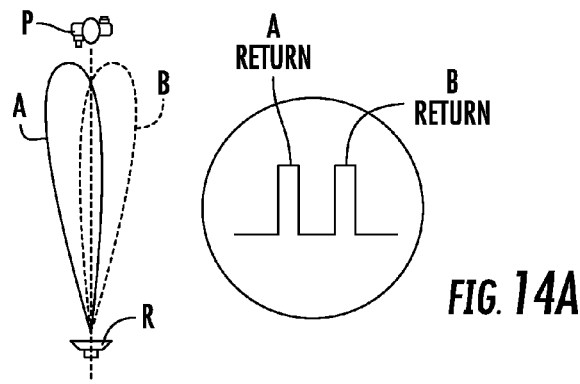
FIG. 14 illustrates possible modalities of execution of processing functions in various embodiments.
Figure 14B:
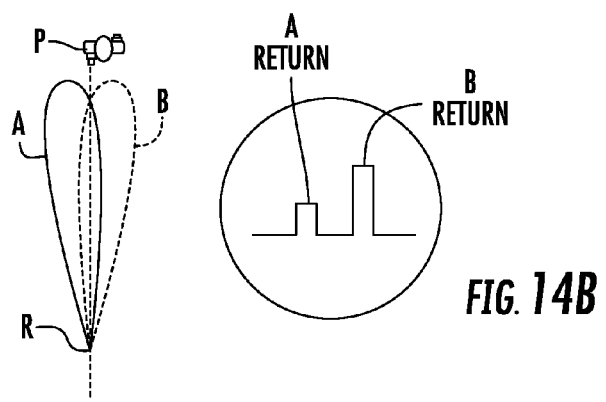

FIG. 14 illustrates schematically the application of this criterion with reference to the azimuth information. The top part of FIG. 14, designated by a) represents the situation where a target P is in a central angular position with respect to two beams A and B resulting from the action of beam forming, giving rise to two peaks of equal amplitude in the return signal (RETURN A and RETURN B). The bottom part of the same figure, designated by b, represents the situation deriving from an asymmetrical positioning of the target P, in a position substantially aligned with the beam B, with a peak of the signal for the beam B (RETURN B) having an amplitude greater than the peak associated to the beam A (RETURN A).

In various embodiments, the scheme exemplified with reference to FIGS. 13 and 14 makes it possible, thanks to the availability of a continuous value of the speed signal determined accurately (starting from the raw detection signals of the radio-frequency stage), to derive from the speed signal generated by the filter 2022 also a corresponding value of acceleration of the target.

Figure 15:
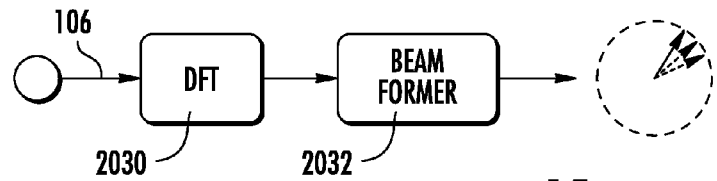
FIGS. 15 to 17 are further block diagrams representing details of embodiments.
Figure 16:
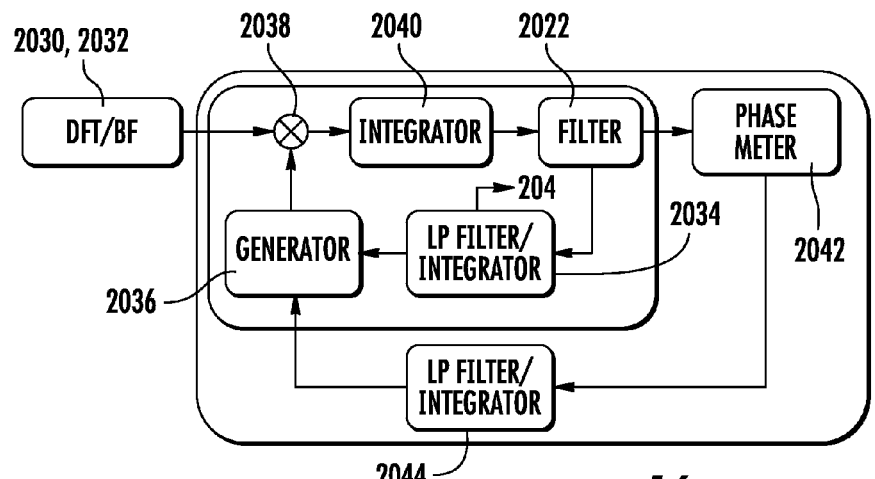
Figure 17:
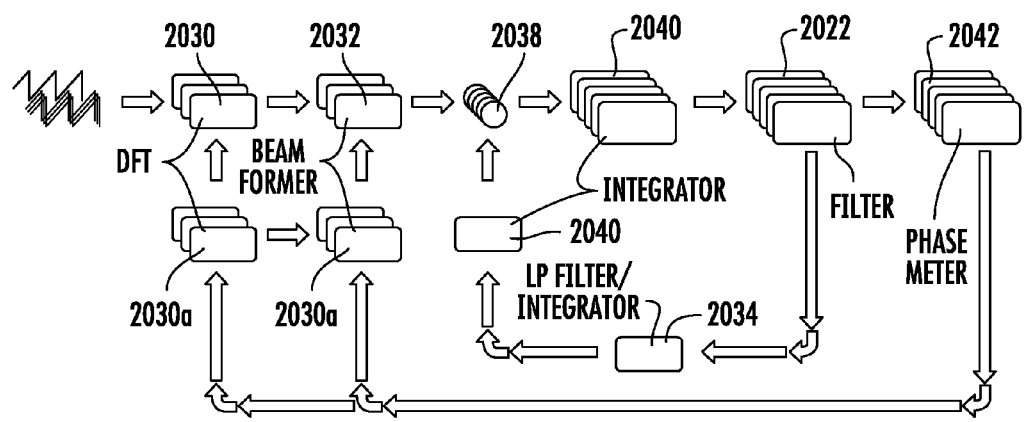

FIGS. 15 to 17 exemplify possible embodiments which take into account the possibility of carrying out a de-noising filtering action on the signals coming from the modules 2030 and 2032 that carry out (for example, on three points) the DFT and (for example, once again on three points) the beam-forming action.

As represented schematically in FIG. 15, the complex value of the target signal tracked by the filter 2022 may be viewed as a sort of complex vector that rotates, so that a possible action of averaging implemented thereon (for example, by calculating the mean value of the last N samples) could induce, as a function of the speed of the target P and of the integration in time, a considerable reduction—virtually annihilation—of the useful signal.

The embodiments as exemplified in FIGS. 16 and 17 aim at overcoming this difficulty by carrying out a coherent filtering implemented according to criteria ideally amounting to an action aiming at "stopping" the rotating vector. Conceptually, the function performed in the schemes exemplified in FIGS. 16 and 17 may be viewed as the application of a sort of "counter-rotation" in order to enable a coherent accumulation (or, more in general, a coherent filtering) of the signal at output from the modules 2030 and 2032 that execute the DFT and the beam-forming action. Coherent filtering (namely, with processing of the signal in amplitude and not in power) is in fact more effective for the purposes of reduction of noise as compared to incoherent processing.

What has been mentioned above applies of course to determination of the modulus of said vector: the phase and, in particular, the variation of phase of said vector in time constitute in fact the information of speed of the target, which, as indicated in FIG. 16, also continues in this case to be computed and sent on to the section 204.

In various embodiments, the effective information of speed may in fact be present at output from the block 2034 that determines the counter-rotation frequency. Consequently, in the example of embodiment of FIG. 16 it may be envisaged that the filter 2022 does not converge on the frequency corresponding to the speed of the target but converges on zero frequency, on account of the counter-rotation imposed by the feedback.

The information regarding the speed of rotation of the complex signal is hence in any case available at output from the block 2034 so that it can be sent to the section 204.

This enables, in the embodiment exemplified in FIG. 16, a frequency-locked loop (FLL) to be provided in which the aforesaid speed-of-rotation signal is supplied to a lowpass filter/integrator 2034 and from this to a complex-exponential generator 2036, which generates (according to Euler formula, with pulsation value w identified by the value at output from the filter 2022) the counter-rotation signal. Once the complex exponential has been mixed in a mixer 2038 with the output of the modules 2030, 2032, it gives rise to a vector that is no longer rotating, which supplied to a coherent integrator 2040 enables supply of the adaptive filter 2022 with a de-noised signal.

In various embodiments, the signal may then be de-noised, since it is "stationary" (at zero frequency, as explained previously), which enables application of the coherent integration and a de-noising action to be obtained.

Various embodiments as exemplified in FIG. 16 may envisage (in addition or as an alternative to) the presence of an outer loop designed to control the phase of the aforesaid complex rotating vector performing a function substantially resembling that of a phase-locked loop (PLL), that is slower than the inner loop of the frequency-locked loop (FLL), but with greater accuracy. The outer loop of the phase-locked loop is based upon a phase meter 2042, the output signal of which is passed to a lowpass filter/integrator 2044 to be used as further signal for driving the complex-exponential generator 2036.

In steady-state conditions, the aforesaid generator 2036 applies to the mixer 2038 a frequency exactly equal and opposite to the input frequency. Consequently, the vector at output from the mixer 2038 is, so to speak, frozen as regards the rotation, which enables accumulation in time of the values thereof, chirp by chirp, without loss of useful signal thanks to the lowpass effect of the integration, with the effect of rejection of noise.

For instance, once the frequency is locked, the control of the phase loop can be activated with the aim of keeping the phase of the vector fixed in time. In this way, it is possible to achieve a greater accuracy linked to the behaviour of the phase control as compared to the frequency control. The relative weights of the phase-locked loop and of the frequency-locked loop in driving the complex-exponential generator 2036 may be varied in time as a function of the behaviour of the target.

The diagram of FIG. 17 (where the representation of the phase-locked loop 2042, 2044 has been omitted for simplicity of illustration) highlight how, assuming that both the DFT module 2030 and the beam-former 2032 each operate, for example, on three points, it is possible to perform the functions of mixer 2038, integration 2040, adaptive filtering 2022, and evaluation of the peak power on, for example, five points (the central value counts in fact for both of the triads: this may be understood by immediate analogy with the scheme of FIG. 11).

Whatever the specific details of implementation, various embodiments may be based on various common aspects; for example:

i) the detection signals are subjected, in general, to Fourier-transform processing (e.g., 1D FFT in the modules 212 and DFT in the module 2030) and to beam-forming processing (e.g., in the module 214 and in the module 2032) with the overall aim of generating values of distance or range R, azimuth θ and speed for at least one target of the radar system R;

ii) a process of acquisition of the target (performed, for example, in the section 200) is provided which envisages subjecting the sequence of detection signals for each of the receiving antennas RX to 1D-FFT processing (in the modules 212) and the detection signals of the plurality of receiving antennas RX to beam-forming processing (in the module 214) to produce detection signals subjected to 1D-FFT processing (in the modules 212) and beam-forming processing (in the module 214) that are able to yield approximate values of range R and azimuth θ of the target, without the need—in the acquisition process—to obtain a speed value of the target itself;

iii) there is then envisaged a process of tracking of the target (performed, for example, in the section 202) in which a complex-valued target signal is tracked (for example, via CANF filtering 2022), the variation of said complex-valued target signal supplying a value of speed of the target. Whether this is performed, as illustrated in FIG. 12, on detection signals subjected to 1D-FFT processing (in the modules 212) and beam-forming processing (in the module 214), or it is performed, as illustrated in FIG. 13, on raw detection signals coming from the radio-frequency stage 10 (hence not subjected to 1D-FFT processing and beam-forming processing) the tracking process is conducted on a subset of detection signals selected, for instance, by the selection logic 2020 of FIG. 12 controlled in feedback by the module 2024, or else on the various points—e.g., three values of range and three values of angle—on which the DFT 2030 and the beam forming 2032 of FIG. 13 act, controlled in feedback by the module 2033. The selection may be made as a function of the approximate values of range R and azimuth θ obtained in the acquisition process using the aforesaid approximate values:

for governing the function of sweeping of adjacent cells represented in FIG. 11, in the embodiments exemplified in FIG. 12; or else as values of initialization of the feedback for execution of DFT or beam-forming processing in the embodiments exemplified in FIG. 13.

Without prejudice to the principle of the invention, the details of construction and the embodiments may vary, even significantly, with respect to what has been illustrated herein purely by way of non-limiting example, without thereby departing from the sphere of protection of the invention, said sphere of protection being defined by the annexed claims.

What is claimed is:

1. A method comprising:
receiving signals using a plurality of receiving antennas comprising sequences of chirp-modulated signals, and
using a memory and a processor cooperating therewith to
mix the received signals with replicas of the modulated signals to produce, for each antenna in the plurality of receiving antennas, a sequence of detection signals, the detection signals being subjected to Fourier transform processing, and beam-forming processing to generate range, azimuth and speed values for at least one target of the radar system,
perform a target acquisition process including subjecting the sequence of detection signals for each antenna in the plurality of receiving antennas to mono-dimensional FFT processing and the detection signals for the plurality of receiving antennas to beam-forming processing to produce mono-dimensional FFT, and beam-forming processed detection signals adapted to provide approximate range and azimuth values for at least one target of the radar system, and
perform a target tracking process including tracking, in a subset of detection signals for the at least one target selected as a function of the approximate range and azimuth values provided by the acquisition process, a complex-valued target signal, the variation of the phase of the complex-valued target signal providing a speed value for the at least one target,
wherein the tracking process includes tracking the complex-valued target signal over a set of adjacent cells located about the approximate range and azimuth values provided by the acquisition process, whereby the presence of a peak value of the complex-valued target signal in a cell of the set of adjacent cells is indicative of the location of the at least one target at the cell and the passage of the peak value of the complex-value target signal to another cell of the set of adjacent cells is indicative of the displacement of the at least one target to the another cell.

2. The method of claim 1 further comprising using the memory and processor to select the set of adjacent cells to include a central cell of the set identified by the approximate range and azimuth values provided by the acquisition process, a first pair of neighboring cells having lower and higher range values, respectively, and the same azimuth value of the central cell, and a second pair of neighboring cells having lower and higher respectively, azimuth values and the same range value of the central cell.

3. The method of claim 1 further comprising using the memory and processor to subject the mono-dimensional FFT and beam-forming processed detection signals to at least one of de-noising power integration and CFAR processing.

4. The method of claim 1 further comprising using the memory and processor to perform the tracking process on detection signals not subjected to the mono-dimensional FFT and beam-forming processing, the tracking process including:
   discrete Fourier transform processing the detection signals for a plurality of range values and beam-forming processing the detection signals for a plurality of azimuth values starting from the approximate range and azimuth values provided by the acquisition process; and
   updating the range and azimuth values for the OFT processing and beam-forming processing based on feedback values provided from the tracking of the complex-valued target signal, whereby the OFT processing and beam-forming processing provide accurate range and azimuth values for the at least one target.

5. The method of claim 4 further comprising using the memory and processor to track the complex-valued target signal in detection signals subjected to mixing with a complex exponential signal to counter the variation of the phase of the complex-valued target signal, and coherently de-noising the complex-valued target signal after mixing with the complex exponential signal.

6. The method of claim 5 further comprising using the memory and processor to generate the complex exponential signal within a frequency-lock loop driven by the variation of the phase of the complex-valued target signal.

7. The method of claim 5 further comprising using the memory and processor to generate the complex exponential signal within a phase-lock loop driven by the phase of the complex-valued target signal.

8. The method of claim 1 further comprising using the memory and processor to derive from the speed value for the at least one target an acceleration value for the at least one target.

9. The method of claim 1 further comprising using the memory and processor to track the complex-valued target signal by complex adaptive filtering of the subset of detection signals.

10. The method of claim 1 further comprising using the memory and processor to produce, as a function of the approximate range and azimuth values provided by the acquisition process, a list of targets covered by the radar system and updating the list when a target enters or leaves the radar system coverage.

11. A device for a processing signals received from a plurality of receiving antennas comprising sequences of chirp-modulated signals, the device comprising:
   a memory and a processor cooperating therewith to
      mix the received signals with replicas of the modulated signals to produce, for each antenna in the plurality of receiving antennas, a sequence of detection signals, the detection signals being subjected to Fourier transform processing and beam-forming processing to generate range, azimuth and speed values for at least one target of the radar system,
      perform a target acquisition process including subjecting the sequence of detection signals for each antenna in the plurality of receiving antennas to mono-dimensional FFT processing and the detection signals for the plurality of receiving antennas to beam-forming processing to produce mono-dimensional FFT, and beam-forming processed detection signals adapted to provide approximate range and azimuth values for at least one target of the radar system, and
      perform a target tracking process including tracking, in a subset of detection signals for the at least one target selected as a function of the approximate range and azimuth values provided by the acquisition process, a complex-valued target signal, the variation of the phase of the complex-valued target signal providing a speed value for the at least one target,
   wherein the tracking process includes tracking the complex-valued target signal over a set of adjacent cells located about the approximate range and azimuth values provided by the acquisition process, whereby the presence of a peak value of the complex-valued target signal in a cell of the set of adjacent cells is indicative of the location of the at least one target at the cell and the passage of the peak value of the complex-value target signal to another cell of the set of adjacent cells is indicative of the displacement of the at least one target to the another cell.

12. The device of claim 11 wherein the processor is configured to select the set of adjacent cells to include a central cell of the set identified by the approximate range and azimuth values provided by the acquisition process, a first pair of neighboring cells having lower and higher range values, respectively, and the same azimuth value of the central cell, and a second pair of neighboring cells having lower and higher respectively, azimuth values and the same range value of the central cell.

13. The device of claim 11 wherein the processor is configured to subject the mono-dimensional FFT and beam-forming processed detection signals to at least one of de-noising power integration and CFAR processing.

14. The device of claim 11 wherein the processor is configured to perform the tracking process on detection signals not subjected to the mono-dimensional FFT and beam-forming processing, the tracking process including:
   discrete Fourier transform processing the detection signals for a plurality of range values and beam-forming processing the detection signals for a plurality of azimuth values starting from the approximate range and azimuth values provided by the acquisition process; and
   updating the range and azimuth values for the OFT processing and beam-forming processing based on feedback values provided from the tracking of the complex-valued target signal, whereby the OFT processing and beam-forming processing provide accurate range and azimuth values for the at least one target.

15. A radar system comprising:
   a plurality of receiving antennas configured to receive signals comprising sequences of chirp-modulated signals; and
   a memory and a processor cooperating therewith to
      mix the received signals with replicas of the modulated signals to produce, for each antenna in the plurality of receiving antennas, a sequence of detection signals, the detection signals being subjected to Fourier transform processing and beam-forming processing to generate range, azimuth and speed values for at least one target of the radar system,
      perform a target acquisition process including subjecting the sequence of detection signals for each antenna in the plurality of receiving antennas to mono-dimensional FFT processing and the detection signals for the plurality of receiving antennas to beam-forming processing to produce mono-dimensional FFT, and beam-forming processed detection signals adapted to provide approximate range and azimuth values for at least one target of the radar system, and perform a target tracking process including tracking, in a subset of detection signals for the at least one target selected as a function of the approximate range and azimuth values provided by the acquisition process, a complex-valued target signal, the variation of the phase of the complex-valued target signal providing a speed value for the at least one target, wherein the tracking process includes tracking the complex-valued target signal over a set of adjacent cells located about the approximate range and azimuth values provided by the acquisition process, whereby the presence of a peak value of the complex-valued target signal in a cell of the set of adjacent cells is indicative of the location of the at least one target at the cell and the passage of the peak value of the complex-value target signal to another cell of the set of adjacent cells is indicative of the displacement of the at least one target to the another cell.

16. The system of claim 15 wherein the processor is configured to select the set of adjacent cells to include a central cell of the set identified by the approximate range and azimuth values provided by the acquisition process, a first pair of neighboring cells having lower and higher range values, respectively, and the same azimuth value of the central cell, and a second pair of neighboring cells having lower and higher respectively, azimuth values and the same range value of the central cell.

17. The system of claim 15 wherein the processor is configured to subject the mono-dimensional FFT and beam-forming processed detection signals to at least one of de-noising power integration and CFAR processing.

18. The system of claim 15 wherein the processor is configured to perform the tracking process on detection signals not subjected to the mono-dimensional FFT and beam-forming processing, the tracking process including:

discrete Fourier transform processing the detection signals for a plurality of range values and beam-forming processing the detection signals for a plurality of azimuth values starting from the approximate range and azimuth values provided by the acquisition process; and updating the range and azimuth values for the OFT processing and beam-forming processing based on feedback values provided from the tracking of the complex-valued target signal, whereby the OFT processing and beam-forming processing provide accurate range and azimuth values for the at least one target.

19. A non-transitory computer-readable medium having computer-executable instructions for causing a computer to perform steps comprising:

receiving signals from a plurality of receiving antennas, the signals comprising sequences of chirp-modulated signals;

mixing the received signals with replicas of the modulated signals to produce, for each antenna in the plurality of receiving antennas, a sequence of detection signals, the detection signals being subjected to Fourier transform processing and beam-forming processing to generate range, azimuth and speed values for at least one target of the radar system;

performing a target acquisition process including subjecting the sequence of detection signals for each antenna in the plurality of receiving antennas to mono-dimensional FFT processing and the detection signals for the plurality of receiving antennas to beam-forming processing to produce mono-dimensional FFT, and beam-forming processed detection signals adapted to provide approximate range and azimuth values for at least one target of the radar system; and performing a target tracking process including tracking, in a subset of detection signals for the at least one target selected as a function of the approximate range and azimuth values provided by the acquisition process, a complex-valued target signal, the variation of the phase of the complex-valued target signal providing a speed value for the at least one target;

wherein the tracking process includes tracking the complex-valued target signal over a set of adjacent cells located about the approximate range and azimuth values provided by the acquisition process, whereby the presence of a peak value of the complex-valued target signal in a cell of the set of adjacent cells is indicative of the location of the at least one target at the cell and the passage of the peak value of the complex-valued target signal to another cell of the set of adjacent cells is indicative of the displacement of the at least one target to the another cell.

20. The non-transitory computer-readable medium of claim 19 further having computer-executable instructions for causing the computer to select the set of adjacent cells to include a central cell of the set identified by the approximate range and azimuth values provided by the acquisition process, a first pair of neighboring cells having lower and higher range values, respectively, and the same azimuth value of the central cell, and a second pair of neighboring cells having lower and higher respectively, azimuth values and the same range value of the central cell.

21. The non-transitory computer-readable medium of claim 19 further having computer-executable instructions for causing the computer to subject the mono-dimensional FFT and beam-forming processed detection signals to at least one of de-noising power integration and CFAR processing.

22. The non-transitory computer-readable medium of claim 19 further having computer-executable instructions for causing the computer to perform the tracking process on detection signals not subjected to the mono-dimensional FFT and beam-forming processing, the tracking process including:

discrete Fourier transform processing the detection signals for a plurality of range values and beam-forming processing the detection signals for a plurality of azimuth values starting from the approximate range and azimuth values provided by the acquisition process; and updating the range and azimuth values for the OFT processing and beam-forming processing based on feedback values provided from the tracking of the complex-valued target signal, whereby the OFT processing and beam-forming processing provide accurate range and azimuth values for the at least one target.

* * * * *